United States Patent
Adachi et al.

(10) Patent No.: US 11,027,675 B2
(45) Date of Patent: Jun. 8, 2021

(54) WIRE HARNESS

(71) Applicant: YAZAKI CORPORATION, Tokyo (JP)

(72) Inventors: Hideomi Adachi, Makinohara (JP); Takeshi Ogue, Makinohara (JP); Masahide Tsuru, Makinohara (JP); Hiroyuki Yoshida, Makinohara (JP); Toshihiro Nagashima, Makinohara (JP); Tetsuo Yamada, Makinohara (JP); Kenta Yanazawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/692,234

(22) Filed: Nov. 22, 2019

(65) Prior Publication Data

US 2020/0198558 A1    Jun. 25, 2020

(30) Foreign Application Priority Data

Dec. 25, 2018    (JP) .............................. JP2018-240582

(51) Int. Cl.
   *B60R 16/02*    (2006.01)
   *H01B 7/00*    (2006.01)

(52) U.S. Cl.
   CPC ....... *B60R 16/0215* (2013.01); *H01B 7/0045* (2013.01)

(58) Field of Classification Search
   CPC . B60R 16/0207; B60R 16/0215; B60R 16/02; H01B 7/0045; H01B 7/00; H01B 7/17; H01B 7/20; H02G 3/06; H02G 3/32; H02G 3/0468; H02G 3/0481; H02G 3/04
USPC ....................................................... 174/72 A
See application file for complete search history.

(56) References Cited

U.S. PATENT DOCUMENTS

| | | | |
|---|---|---|---|
| 2002/0000499 A1 | 1/2002 | Aoki et al. | |
| 2006/0170244 A1 | 8/2006 | Blase | |
| 2013/0277106 A1 | 10/2013 | Toyama | |
| 2015/0041210 A1 | 2/2015 | Inao et al. | |
| 2016/0152196 A1 | 6/2016 | Inao et al. | |
| 2017/0327060 A1* | 11/2017 | Nakajima | B60R 16/0215 |
| 2018/0186315 A1* | 7/2018 | Terzis | H01R 13/5833 |
| 2019/0043642 A1 | 2/2019 | Mizuno et al. | |
| 2019/0217792 A1* | 7/2019 | Kawaguchi | B60R 16/02 |

FOREIGN PATENT DOCUMENTS

| | | | | |
|---|---|---|---|---|
| EP | 2762366 A1 | | 8/2014 | |
| JP | 2003025850 A | * | 1/2003 | ............. B60R 16/02 |
| JP | 2012035803 A | * | 2/2012 | ............... H01B 7/00 |

(Continued)

*Primary Examiner* — Timothy J Thompson
*Assistant Examiner* — Guillermo J Egoavil
(74) *Attorney, Agent, or Firm* — Sughrue Mion, PLLC

(57) ABSTRACT

A wire harness includes a harness main body including one or a plurality of conductive paths and an exterior member through which the one or a plurality of conductive paths is inserted, a packing bent portion arranged in a middle of the harness main body and used as a bent portion at a position suitable for packing the wire harness, and a routing path regulating portion arranged at the position suitable for packing the wire harness and configured to regulate the wire harness at a desired path when routing the wire harness.

1 Claim, 10 Drawing Sheets

(56) References Cited

FOREIGN PATENT DOCUMENTS

| | | |
|---|---|---|
| JP | 2012-142105 A | 7/2012 |
| JP | 2013-243900 A | 12/2013 |
| WO | 2015005402 A1 | 1/2015 |
| WO | 2017/145887 A1 | 8/2017 |

* cited by examiner

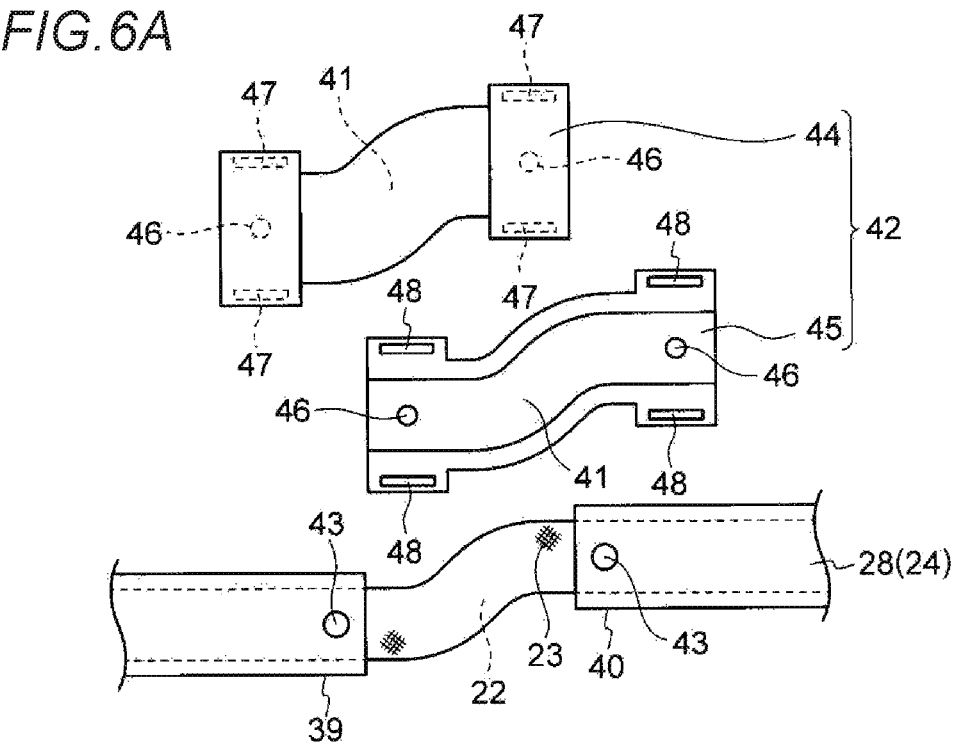
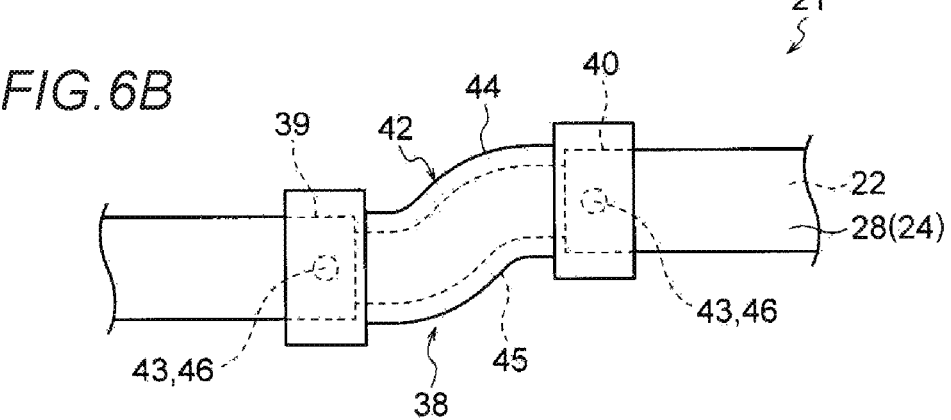

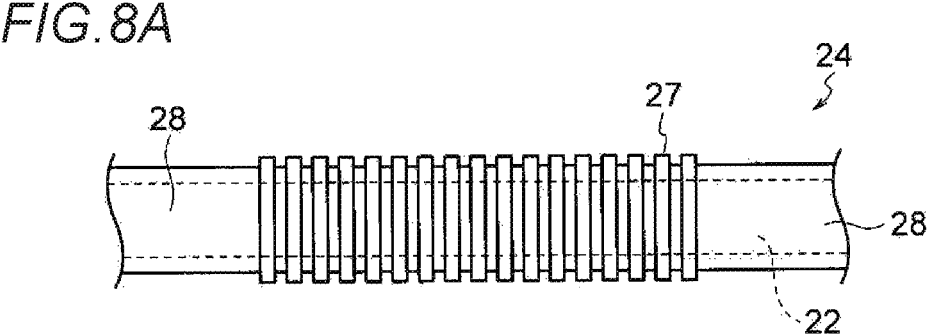
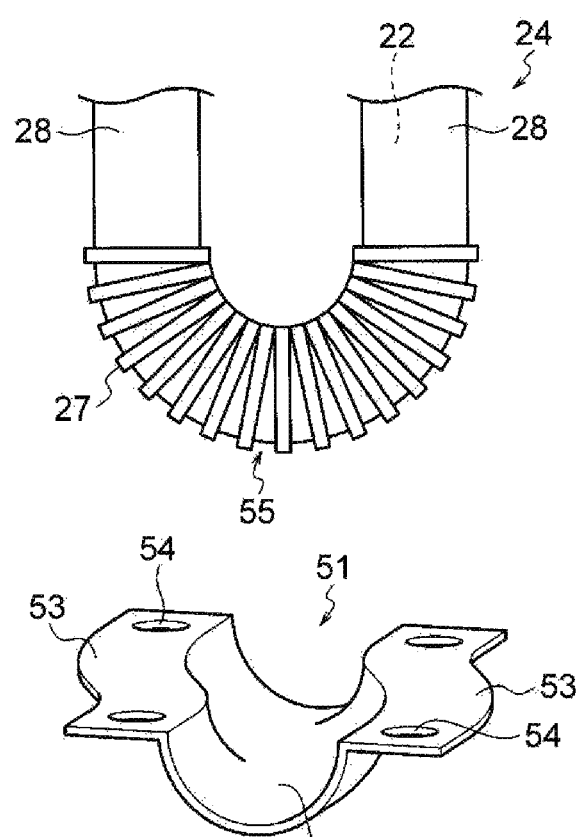
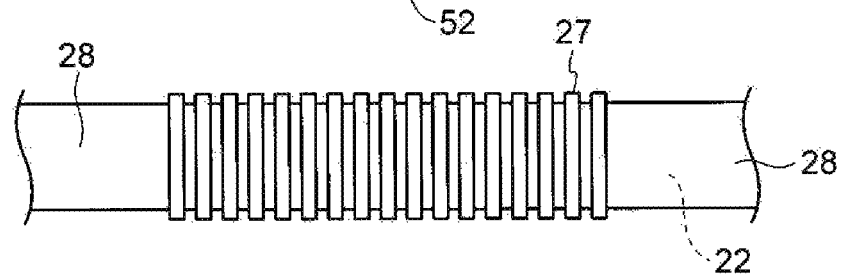

WIRE HARNESS

CROSS REFERENCE TO RELATED APPLICATIONS

This application claims priority from Japanese Patent Application No. 2018-240582 filed on Dec. 25, 2018, the entire contents of which are incorporated herein by reference.

BACKGROUND OF THE INVENTION

Field of the Invention

The present invention relates to a wire harness including a conductive path and an exterior member.

Description of Related Art

For example, a wire harness routed in an electric automobile or a hybrid automobile is long and includes one or a plurality of conductive paths and an exterior member having a pipe shape through which the conductive path is inserted. The wire harness is manufactured at a harness manufacturing site and then packed and transported to a vehicle assembly site. At the vehicle assembly site, the wire harness in a packed state is taken out from a box, and the taken out wire harness is routed to a predetermined position of the vehicle (see Patent Literature 1 below).
[Patent Literature 1] JP-A-2013-243900

In a related art, since a wire harness is long, it is very difficult to transport the wire harness to a vehicle assembly site as it is after manufacturing. If the wire harness is packed so as to be in a folded state, the wire harness becomes compact and easy to be transported. Therefore, in the related art described above, a portion of the wire harness that can be bent when the vehicle is routed is used as a bent portion (folded portion) at the time of packing. However, the portion that can be bent when the vehicle is routed is not necessarily positioned at a position suitable for the bent portion (folded portion) at the time of packing. This is because there are many portions where it is desired to regulate a path when the vehicle is routed.

SUMMARY

One or more embodiments provide a wire harness that can be bent at the time of packing and can regulate a path when a vehicle is routed.

In an aspect (1), a wire harness includes a harness main body including one or a plurality of conductive paths and an exterior member through which the one or a plurality of conductive paths is inserted, a packing bent portion arranged in a middle of the harness main body and used as a bent portion at a position suitable for packing the wire harness, and a routing path regulating portion arranged at the position suitable for packing the wire harness and configured to regulate the wire harness at a desired path when routing the wire harness.

According to the aspect (1), since the packing bent portion is formed at the position suitable for packing, the wire harness can be packed in a compact state by the packing bent portion. In addition, according to the present invention, since the routing path regulating portion is provided at the packing bent portion, the wire harness can be regulated in the desired path when routing the harness even if there is the packing bent portion.

In an aspect (2), the exterior member includes a joint mechanism in accordance with the position suitable for packing the wire harness. The joint mechanism includes one divided portion and another divided portion that are arranged so as to be separated from each other in an axial direction of the exterior member, a base portion arranged so as to overlap the one divided portion and the other divided portion, one rotating shaft portion for making the one divided portion rotatable with respect to one end of the base portion, and another rotating shaft portion for making the other divided portion rotatable with respect to the other end of the base portion. The packing bent portion is formed when the one divided portion and the other divided portion are arranged in a substantially folded state without being connected to each other by the joint mechanism. The routing path regulating portion is arranged at the position suitable for packing the wire harness when the one divided portion and the other divided portion are arranged in a substantially linear shape by the joint mechanism.

According to the aspect (2), since the joint mechanism is used in the exterior member, and the packing bent portion is formed at the position suitable for packing using the joint mechanism, the wire harness can be packed in the compact state by the packing bent portion. In addition, according to the present invention, since the routing path regulating portion is provided at the packing bent portion by the joint mechanism, the wire harness can be regulated in the desired path when routing the harness even if there is the packing bent portion.

In an aspect (3), the exterior member includes one divided portion and another divided portion arranged so as to be separated from each other in an axial direction of the exterior member, and a connecting tubular portion having an internal space that can be deformed into the desired path and connecting the one divided portion and the other divided portion. The packing bent portion is formed when the one divided portion and the other divided portion are arranged in a substantially folded state without being connected to each other by a connecting tubular portion. The routing path regulating portion is arranged at the position suitable for packing the wire harness when the one divided portion and the other divided portion are connected by the connecting tubular portion.

According to the aspect (3), since the one divided portion and the other divided portion are formed in the middle of the exterior member, and the packing bent portion is formed using a divided portion, the wire harness can be packed in the compact state by the packing bent portion. In addition, according to the present invention, if the one divided portion and the other divided portion is connected by the connecting tubular portion for the desired path, the routing path regulating portion is provided at the packing bent portion, so that the wire harness can be regulated in the desired path when routing the harness even if there is the packing bent portion.

In an aspect (4), the wire harness is further comprising a flexible pipe portion having a flexibility in a middle of the exterior member in an axial direction. The packing bent portion of the flexible pipe portion is formed when the flexible pipe portion is bent into a substantially folded state. The routing path regulating portion is arranged at the position suitable for packing the wire harness when a post-attaching member having a recess portion for the desired path is assembled to the flexible pipe portion released from the substantially folded state.

According to the aspect (4), since the flexible pipe portion is formed in the middle of the exterior member and the packing bent portion is formed using the flexible pipe portion, the wire harness can be packed in the compact state by the packing bent portion. In addition, according to the present invention, the routing path regulating portion is provided at the packing bent portion by assembling the post-attaching member formed with the recess portion for the desired path, so that the wire harness can be regulated in the desired path when routing the harness even if there is the packing bent portion.

In an aspect (5), the wire harness is further comprising a flexible pipe portion having a flexibility in a middle of the exterior member in an axial direction. The packing bent portion of the flexible pipe portion is formed when the flexible pipe portion is bent into a substantially folded state. The routing path regulating portion is arranged at the position suitable for packing the wire harness when a length adjustment member formed with a pipe attaching portion for the desired path is assembled to the flexible pipe portion released from the substantially folded state.

According to the aspect (5), since the flexible pipe portion is formed in the middle of the exterior member and the packing bent portion is formed using the flexible pipe portion, the wire harness can be packed in the compact state by the packing bent portion. In addition, according to the present invention, the routing path regulating portion is provided at the packing bent portion by assembling the length adjustment member formed with the pipe attaching member for the desired path, so that the wire harness can be regulated in the desired path when routing the harness even if there is the packing bent portion.

According to one or more embodiments, it is possible to provide a wire harness that can be bent when packing the harness and can regulate the path when the vehicle is routed. In addition, according to the present embodiment, there is also an effect that the wire harness can be packed in the compact state. Accordingly, there is an effect that the more wire harnesses can be accommodated in the box and transported than before. In addition, since the large number of wire harnesses can be transported at a time, there is an effect that transportation cost can be reduced, for example.

BRIEF DESCRIPTION OF THE DRAWINGS

FIG. 1A is a schematic view showing a routing state of a high voltage wire harness. FIG. 1B is a schematic view showing a routing state of a low voltage wire harness different from FIG. 1A (first embodiment).

FIG. 3A is a schematic view showing a state when manufacturing the harness. FIG. 3B is a schematic view showing a state when packing the harness. FIG. 3C is a schematic view showing a state when routing the harness.

FIG. 5A is a schematic view showing a state when manufacturing the harness. FIG. 5B is a schematic view showing a state when packing the harness. FIG. 5C is a schematic view showing a state before routing the harness.

FIGS. 6A and 6B are views immediately before routing following FIGS. 5A to 5C. FIG. 6A is a schematic view showing a state before being connected by a connecting tubular portion. FIG. 6B is a schematic view showing a state after being connected by the connecting tubular portion.

FIGS. 8A to 8C are views of the wire harness of FIG. 7. FIG. 8A is a schematic view showing a state when manufacturing the harness. FIG. 8B is a schematic view showing a state when packing the harness. FIG. 8C is a schematic view showing a state before routing the harness.

FIG. 9A is a schematic view showing a state after a post-attaching member is attached. FIG. 9B is a schematic view showing a state after another post-attaching member is attached.

DETAILED DESCRIPTION

A harness main body of a wire harness includes one or a plurality of conductive paths and an exterior member through which the conductive path is inserted. In the middle of the harness main body, a packing bent portion used as a bent portion at a position suitable for packing a harness is formed. At a position of the packing bent portion, a routing path regulating portion for regulating a wire harness in a desired path when routing the harness is provided.

A joint mechanism is provided in the middle of the exterior member in an axial direction. In the joint mechanism, when one divided portion and another divided portion is arranged in a substantially folded state, the packing bent portion is formed. In addition, in the joint mechanism, when one divided portion and the other divided portion are arranged in a substantially linear state, the routing path regulating portion is provided at the packing bent portion.

First Embodiment

Figure 1A:
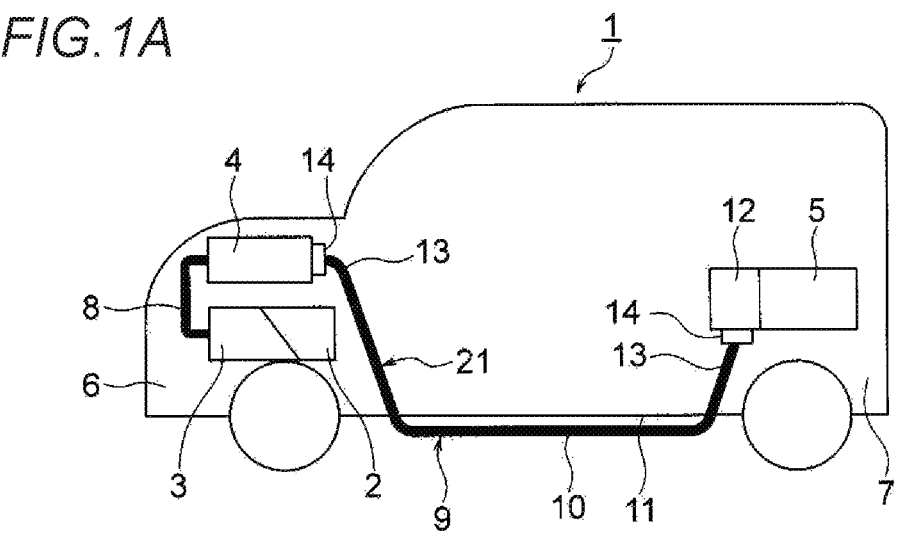
FIGS. 1A and 1B are views showing a wire harness according to an embodiment.
Figure 1B:
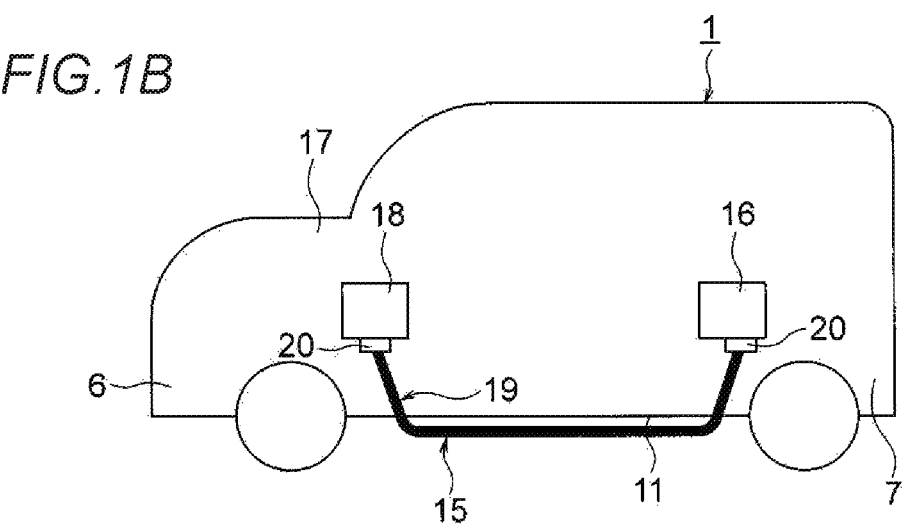
Figure 2:
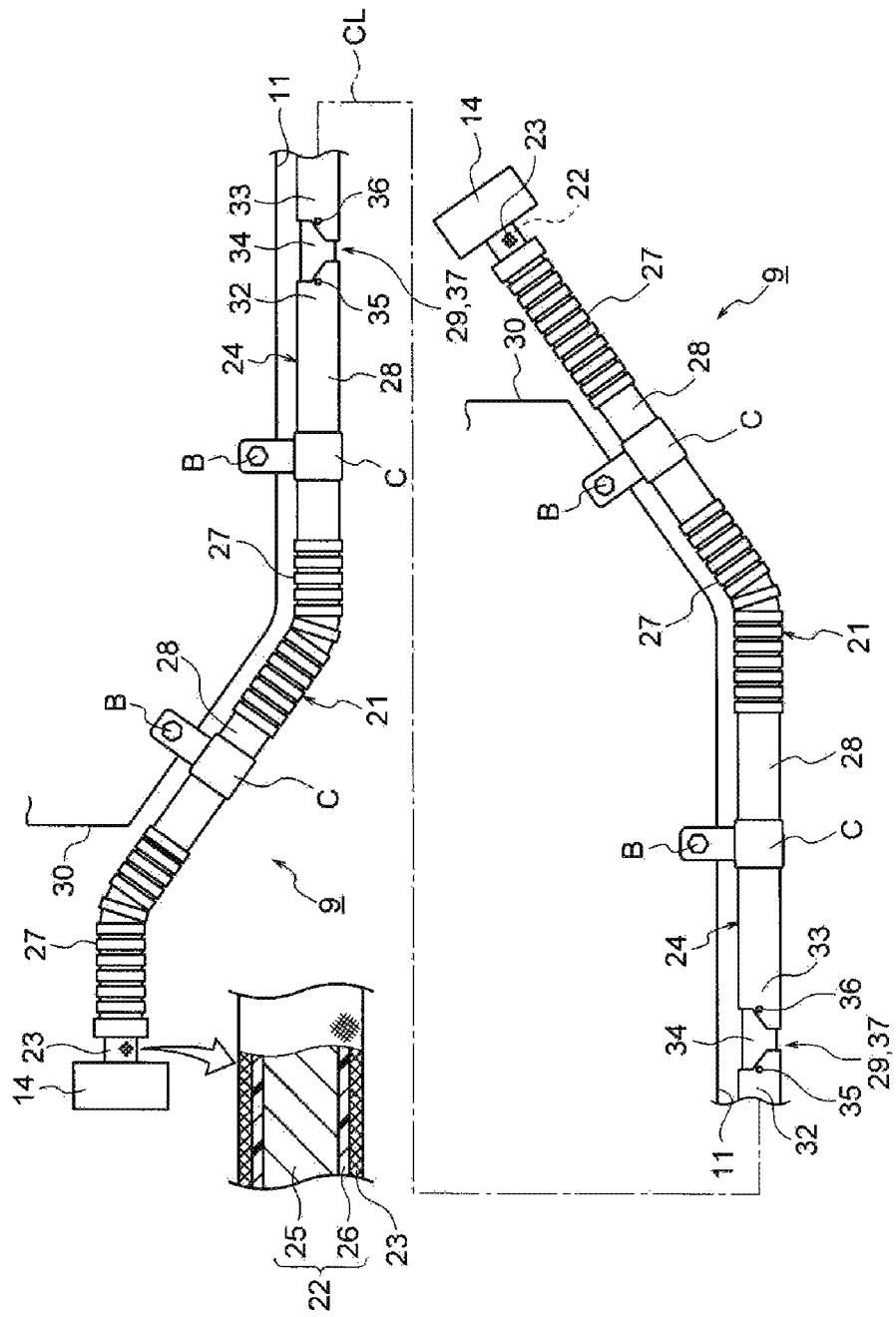
FIG. 2 is a schematic view showing a configuration of a wire harness.
Figure 3A:
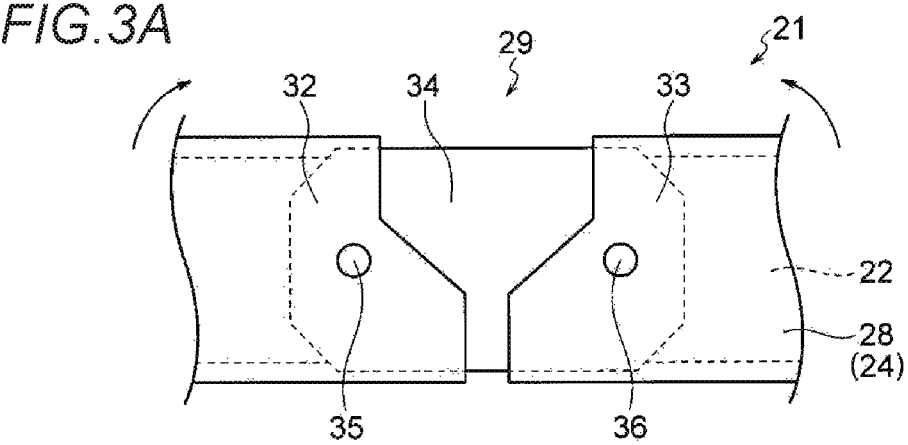
FIGS. 3A to 3C are schematic views showing a joint mechanism of FIG. 2.
Figure 3B:
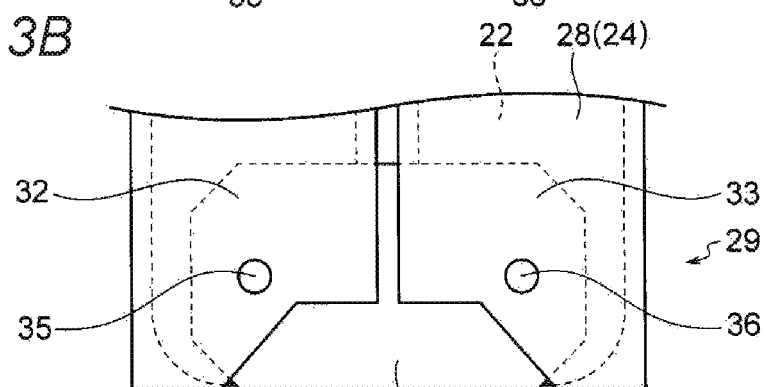
Figure 3C:
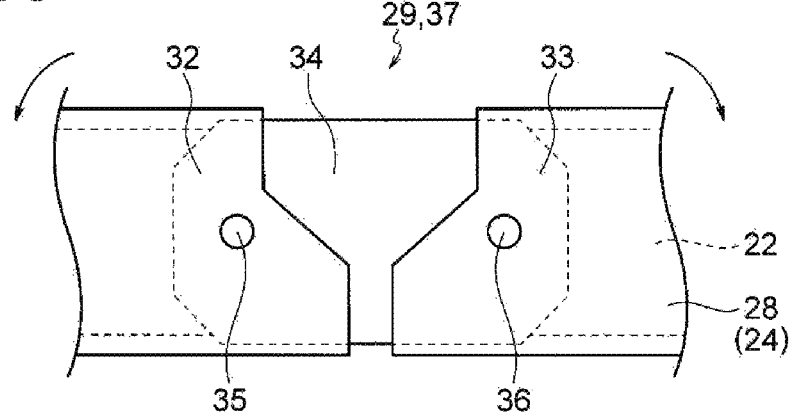

A first embodiment will be described below with reference to the drawings. FIGS. 1A and 1B are views showing a wire harness according to an embodiment. FIG. 1A is a schematic view showing a routing state of a high voltage wire harness. FIG. 1B is a schematic view showing a routing state of a low voltage wire harness different from FIG. 1A. In addition, FIG. 2 is a schematic view showing a configuration of the wire harness. FIGS. 3A to 3C are schematic views showing a joint mechanism of FIG. 2. FIG. 3A is a schematic view showing a state when manufacturing the harness. FIG. 3B is a schematic view showing a state when packing the harness. FIG. 3C is a schematic view showing a state when routing the harness.

In the present embodiment, the present invention is applied to a wire harness routed in a hybrid automobile. Incidentally, the present invention is not limited to the hybrid automobile, and may be applied to an automobile such as a PHV or an electric vehicle using a motor as a drive source, or a general automobile traveling only by an engine. In addition, it is assumed that the engine may be used only for power generation. Besides, the present invention may be applied to a fuel cell automobile or an automatic driving vehicle.

<Configuration of Hybrid Automobile 1>

In FIG. 1A, a reference numeral 1 indicates a hybrid automobile. The hybrid automobile 1 is a vehicle that is driven by mixing two power of an engine 2 and a motor unit 3, and electric power from a battery 5 (battery pack) is supplied to the motor unit 3 via an inverter unit 4. In the present embodiment, the engine 2, the motor unit 3, and the inverter unit 4 are mounted in an engine compartment 6 at a position where front wheels or the like are positioned. In addition, the battery 5 is mounted on an automobile rear portion 7 where rear wheels or the like are provided (may be mounted at a position in an automobile compartment existing behind the engine compartment 6).

The motor unit 3 and the inverter unit 4 are connected by a high voltage wire harness 8 (high voltage motor cable). In addition, the battery 5 and the inverter unit 4 are also connected by a high voltage wire harness 9. An intermediate portion 10 of the wire harness 9 is routed under a vehicle floor 11 of the vehicle (in a vehicle body). In addition, the intermediate portion 10 is routed substantially in parallel along the vehicle floor 11. The vehicle floor 11 is a known body (vehicle body) and is a so-called panel member, and a through hole is formed at a predetermined position thereof. The wire harness 9 is inserted into the through hole in a watertight manner.

The wire harness 9 and the battery 5 are connected to each other via a junction block 12 provided on the battery 5. The junction block 12 is electrically connected to an external connection means such as a shield connector 14 disposed at a harness terminal 13 on a rear end side of the wire harness 9. In addition, the wire harness 9 and the inverter unit 4 are electrically connected to each other via an external connection means such as the shield connector 14 disposed on the harness terminal 13 on a front end side.

The motor unit 3 includes a motor and a generator. In addition, the inverter unit 4 includes an inverter and a converter. The motor unit 3 is formed as a motor assembly including a shield case. In addition, the inverter unit 4 is also formed as an inverter assembly including a shield case. The battery 5 is a Ni-MH type battery or a Li-ion type battery, and is formed as a module. Incidentally, a power storage device such as a capacitor may be used, for example. It is needless to say that the battery 5 is not particularly limited as long as it is for a high voltage that can be used for the hybrid automobile 1, an electric automobile, or the like.

In FIG. 1B, a reference numeral 15 indicates a wire harness. The wire harness 15 is a low voltage (for low voltage) wire harness, and is provided to electrically connect a low voltage battery 16 on the automobile rear portion 7 in the hybrid automobile 1 and an auxiliary device 18 (equipment) mounted on an automobile front portion 17. Like the wire harness 9 of FIG. 1A, the wire harness 15 is routed through the vehicle floor 11 (as an example, may be routed through a vehicle interior side). A reference numeral 19 in the wire harness 15 indicates a harness main body. In addition, a reference numeral 20 indicates a connector.

As shown in FIGS. 1A and 1B, the high voltage wire harnesses 8, 9 and the low voltage wire harness 15 are routed in the hybrid automobile 1. The present invention can be applied to any one of the wire harnesses, but the high voltage wire harness 9 will be described below as a representative example. First, a configuration and a structure of the wire harness 9 will be described.

<Configuration of Wire Harness 9>

In FIG. 1A, the long wire harness 9 routed through the vehicle floor 11 includes a harness main body 21 and the shield connectors 14 (external connection means) respectively disposed in both terminals (harness terminals 13) of the harness main body 21. In addition, the wire harness 9 includes a clamp C (see FIG. 2) for routing itself at a predetermined position and a water stop member (for example, a grommet or the like) (not shown).

<Configuration of Harness Main Body 21>

In FIG. 2, the harness main body 21 includes two long conductive paths 22, a shield member 23 that collectively covers the conductive paths 22, and an exterior member 24 through which the two conductive paths 22 covered with the shield member 23 are inserted. In the first embodiment, the exterior member 24 is a characteristic portion. Specifically, a joint mechanism 29 (described later with reference to FIGS. 3A to 3C) provided on the exterior member 24 becomes a characteristic portion.

<Conductive Path 22>

In FIG. 2, the conductive path 22 includes a conductive conductor 25 and an insulating insulator 26 covering the conductive conductor 25. In the present embodiment, the conductive path 22 is not provided with a sheath (assumed as an example). Since the conductive path 22 is not provided with the sheath, the conductive path 22 is lighter (since the conductive path 22 is long, the conductive path 22 can be significantly reduced in weight as compared with a case having a sheath). Incidentally, the number of the conductive paths 22 is an example.

The conductor 25 is formed into a circular cross section by a copper, a copper alloy, or an aluminum or an aluminum alloy. The conductor 25 may be either a conductor structure formed by twisting a wire or a rod-shaped conductor structure having a circular cross section (round shape) (for example, a round single-core conductor structure, in this case, the conductive path itself is also rod-shaped). The insulator 26 made of an insulating resin material is extruded on an outer surface of the conductor 25 as described above.

The insulator 26 is extruded on an outer peripheral surface of the conductor 25 using a thermoplastic resin material. The insulator 26 is formed as a coating having a circular cross section. The insulator 26 is formed to have a predetermined thickness. As the thermoplastic resin, various known types can be used, and for example, the thermoplastic resin is appropriately selected from a polymer material such as a polyvinyl chloride resin, a polyethylene resin, or a polypropylene resin.

<Shield Member 23>

In FIG. 2, the shield member 23 collectively covers the two conductive paths 22, and in the present embodiment, a braid is used thereto (assumed as one example, the shield member 23 may be a metal foil, a sheet stepping on a metal foil, or the like). The shield member 23 is provided to exhibit a shielding function. The braid (shield member 23) is formed into a tubular shape by knitting an ultrafine wire having a conductivity. In addition, the braid is formed into a shape and a size so as to cover the entire outer peripheral surface from one end of the insulator 26 to the other end thereof. Incidentally, the shield member 23 may cover the two conductive paths 22 one by one.

<Exterior Member 24>

In FIGS. 2 and 3A to 3C, the exterior member 24 is a resin molded product formed using an insulating resin material, and is formed, for example, into a circular cross section so as to accommodate the two conductive paths 22 (not limited thereto, but may be a rectangular cross section, an oval cross section, or the like). The exterior member 24 includes a flexible pipe portion 27 having a flexibility and a straight pipe portion 28 as a portion for routing the conductive path 22 straight (this configuration is merely an example). A plurality of flexible pipe portions 27 and straight pipe portions 28 are formed in a pipe axis direction. In addition, the flexible pipe portions 27 and the straight pipe portions 28 are alternately arranged and formed. The straight pipe portion 28 is provided with the joint mechanism 29 as the characteristic portion.

<Flexible Pipe Portion 27>

In FIG. 2, the flexible pipe portion 27 is formed into a portion that can be bent at a desired angle when the wire harness 9 is packed or transported, or routed to the vehicle (when routed in a path). That is, the flexible pipe portion 27 is formed into the portion that can be bent into a bent shape. In addition, the flexible pipe portion 27 is formed into a portion that can naturally be returned to a state before being bent (a state at the time of resin molding). The flexible pipe portion 27 is formed into a bellows pipe shape as shown in the drawings. That is, the flexible pipe portion 27 is formed into a shape having bellows concave portions and bellows convex portions in a peripheral direction when viewed from the outside. In addition, the flexible pipe portion 27 is formed into a shape such that the bellows concave portions and the bellows convex portions are alternately continued in a pipe axis CL direction.

<Straight Pipe Portion 28>

In FIG. 2, the straight pipe portion 28 is formed into a straight pipe shape. The straight pipe portion 28 is not formed into a flexible portion such as the flexible pipe portion 27. In addition, the straight pipe portion 28 is formed into a portion that does not bend (the portion that does not bend means a portion that does not actively have the flexibility. Incidentally, only a portion where the joint mechanism 29 described later is provided is bent) when the wire harness is packed or transported, or routed in a path. An outer peripheral surface (outer surface) of the straight pipe portion 28 is formed into a shape without irregularities (assumed as one example). The outer peripheral surface of the straight pipe portion 28 is formed as a portion to which the clamp C is attached. The clamp C is a fixing component that is fixed to the vehicle floor 11 or a counterpart fixing member 30 with a bolt B when the wire harness 9 is routed.

The straight pipe portion 28 is formed into a rigid portion as compared with the flexible pipe portion 27. The straight pipe portion 28 is formed in a position or a length matched with the counterpart fixing member 30 (vehicle attachment shape). A longest one of the plurality of straight pipe portions 28 is arranged under the vehicle floor 11.

Since the straight pipe portion 28 arranged under the vehicle floor 11 is the longest as described above, when the straight pipe portion 28 is an unbent, a harness packing state becomes large, and it is necessary to secure a large space for a box. Therefore, in the present embodiment, the joint mechanism 29 is provided at least on the straight pipe portion 28 arranged under the vehicle floor 11, so that the straight pipe portion 28 can be made compact by the joint mechanism 29.

<Joint Mechanism 29>

In FIGS. 2 and 3A to 3C, the joint mechanism 29 is configured to be bendable when packing the harness, and to be able to regulate the harness in a path when the vehicle is routed. The joint mechanism 29 is conventionally configured such that a bent portion (packing bent portion 31) suitable for packing the harness can be provided at a predetermined position of the straight pipe portion 28 that is the unbent portion. The joint mechanism 29 is disposed on the straight pipe portion 28 in accordance with the bent portion (packing bent portion 31) suitable for packing the harness.

The joint mechanism 29 includes one divided portion 32 and another divided portion 33 that are formed into a shape in which the middle of the straight pipe portion 28 in the pipe axis direction is divided, a base portion 34 arranged so as to straddle the one divided portion 32 and the other divided portion 33, one rotating shaft portion 35 for making the one divided portion 32 rotatable with respect to one end of the base portion 34, and another rotating shaft portion 36 for making the other divided portion 33 rotatable with respect to the other end of the base portion 34.

In order to make the one divided portion 32 and the other divided portion 33 rotatable, the one divided portion 32 and the other divided portion 33 are provided with a slit or the like (not shown) for preventing interference with the base portion 34. The base portion 34 according to the present embodiment is arranged inside the one divided portion 32 and the other divided portion 33, but is not limited thereto. That is, the base portion 34 may be arranged outside.

<Manufacturing to Path Routing of Wire Harness 9>

In the above configuration and structure, the wire harness 9 is manufactured as follows (see FIGS. 2 and 3A to 3C). That is, the wire harness 9 is manufactured by inserting the two conductive paths 22 covered with the shield member 23 from one end opening to the other end opening of the exterior member 24 having the joint mechanism 29. In addition, the wire harness 9 is manufactured by attaching the clamp C, a grommet, a boot, or the like to a predetermined position on the outer surface of the exterior member 24 having the joint mechanism 29. Further, the wire harness 9 is manufactured by providing the shield connectors 14 at terminal portions of the conductive path 22.

After the wire harness 9 is manufactured as described above, bending is performed by folding the flexible pipe portion 27 at a predetermined position, and the bent state is maintained. In addition, the one divided portion 32 and the other divided portion 33 are folded into a substantially parallel state from a straight state using the joint mechanism 29, and the packing bent portion (see FIGS. 3A and 3B) is formed by the folding. As a result, the packing of the wire harness 9 is completed (stored in the box). Since the wire harness 9 is formed with the packing bent portion 31 that does not exist in the past, a packing state becomes compact, and the wire harness 9 is transported to the vehicle assembly site while remaining in the compact packing state.

At the vehicle assembly site, the wire harness 9 is attached to the vehicle from a long portion corresponding to the vehicle floor 11 (from the straight pipe portion 28 with the joint mechanism 29). At this time, an operation of returning the one divided portion 32 and the other divided portion 33 to the straight state is performed using the joint mechanism 29 (see FIGS. 3B and 3C), so that a routing path regulating portion 37 for regulating a straight path is provided at the portion where the packing bent portion 31 has been formed. After the long portion corresponding to the vehicle floor 11 is fixed by the clamp C or the like, when the remaining portion is fixed by the clamp C while deflecting (bending) the portion of the flexible pipe portion 27 in the exterior member 24, a series of operations related to the path routing of the wire harness 9 is completed. The wire harness 9 is routed in a desired path.

<Effect of Wire Harness 9>

As described with reference to FIGS. 1A to 3C, in the wire harness 9 according to the first embodiment, the joint mechanism 29 is used in the exterior member 24, and the packing bent portion 31 is formed at a position suitable for packing using the joint mechanism 29, so that the wire harness 9 can be packed in a compact state by the packing bent portion 31. In addition, according to the wire harness 9, the routing path regulating portion 37 is provided at the packing bent portion 31 by the joint mechanism 29, so that the wire harness 9 can be regulated in a desired path when the harness is routed in a path (when routing the harness) even if there is the packing bent portion 31.

Therefore, there is an effect that it is possible to provide the wire harness 9 that can be bent when packing the harness and can regulate the path when the vehicle is routed. In addition, there is also an effect that the wire harness 9 can be packed in the compact state. Accordingly, there is an effect that the more wire harnesses 9 can be accommodated in the box and transported than before. Further, since a large number of wire harnesses 9 can be transported at a time, there is an effect that transportation cost can be reduced, for example.

In the present embodiment, the joint mechanism 29 is provided in the straight pipe portion 28, but it is needless to say that the joint mechanism 29 can be applied to a protector post-attached to the exterior member 24, for example. In this case, a packing bent portion or a routing path regulating portion is provided in a portion of the protector. In addition, the joint mechanism 29 is provided in the long straight pipe portion 28 corresponding to the vehicle floor 11, but it is needless to say that the joint mechanism 29 is not limited thereto, and can also be applied to the shorter straight pipe portion 28.

Second Embodiment

Figure 4:
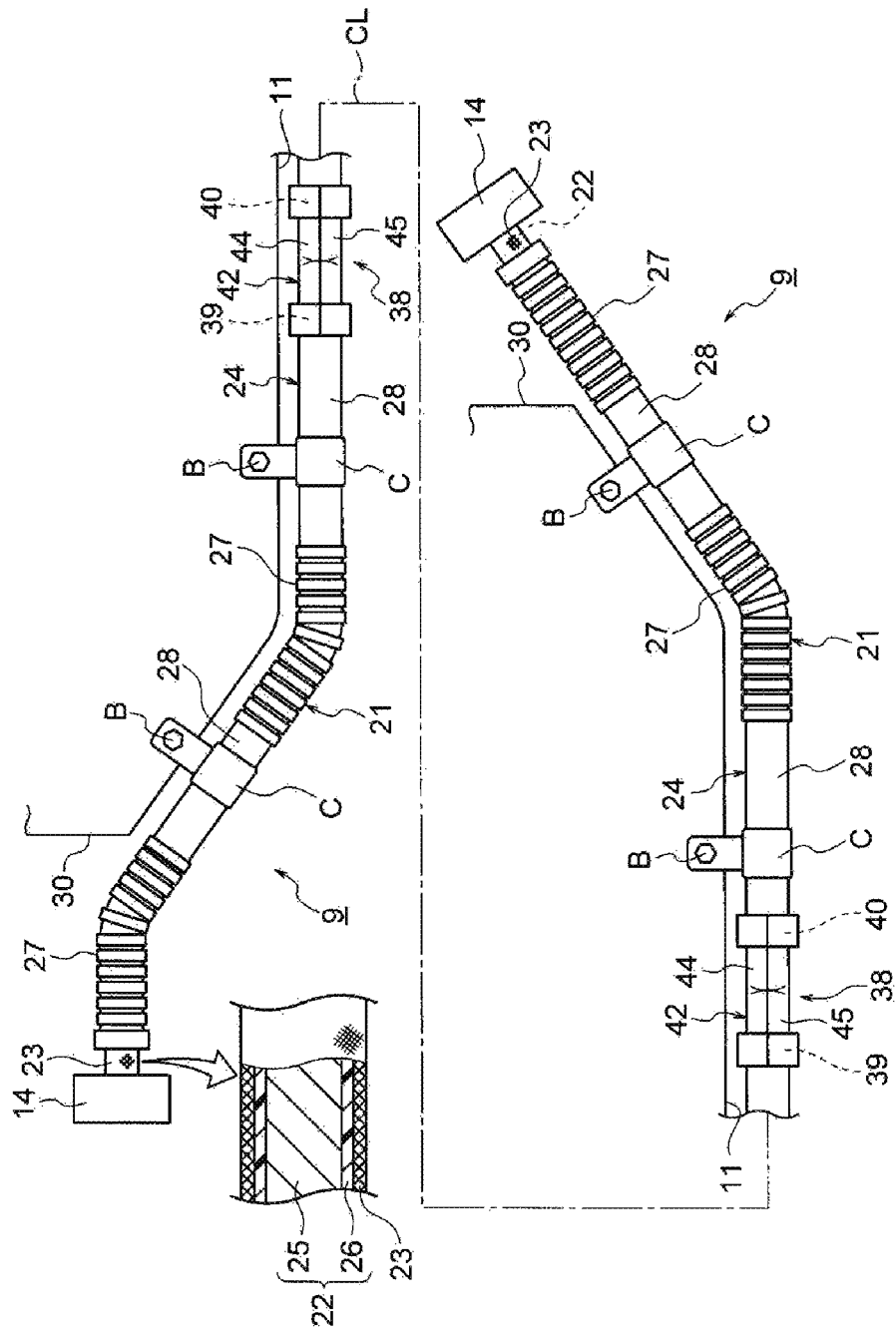
FIG. 4 is a schematic view showing a configuration of another wire harness (second embodiment).
Figure 5A:
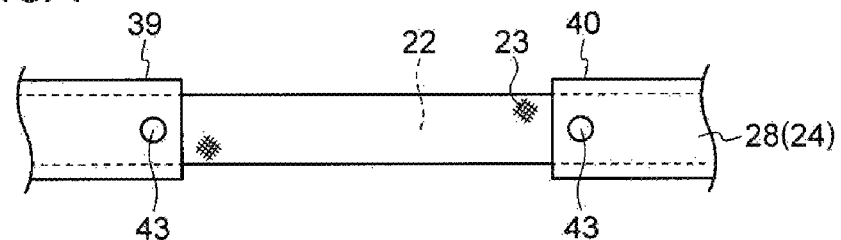
FIGS. 5A to 5C are views of the wire harness of FIG. 4.
Figure 5B:
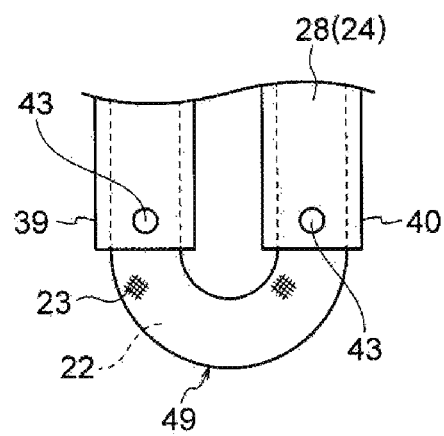
Figure 5C:
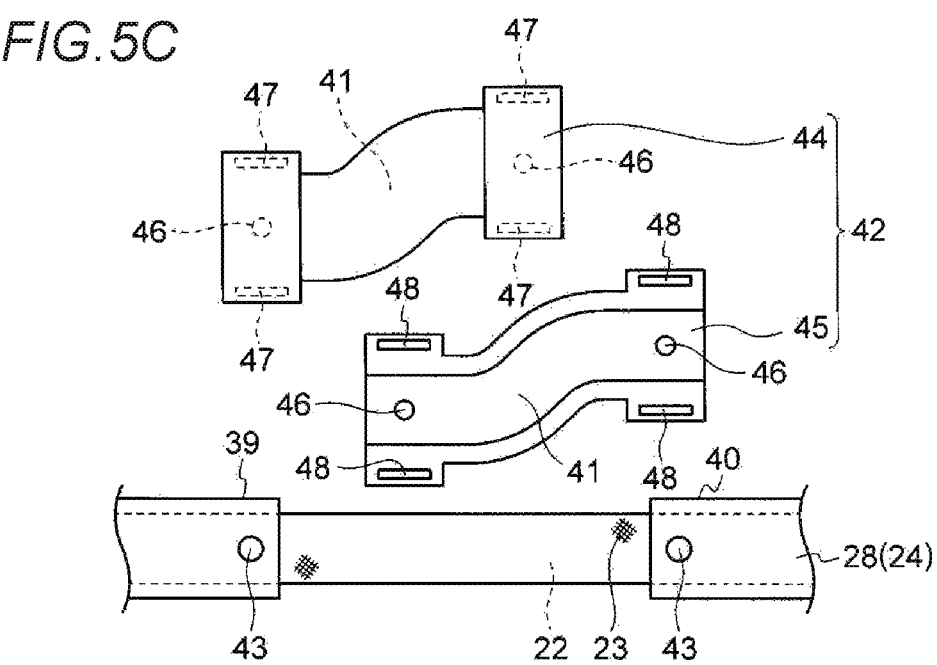

A second embodiment will be described below with reference to the drawings. FIG. 4 is a schematic view showing a configuration of another wire harness. In addition, FIGS. 4 to 6B are views relating to the manufacturing to routing of the wire harness. Incidentally, the same components as in the first embodiment are denoted by the same reference numerals, and a detailed description thereof is omitted.

<Configurations of Wire Harness 9 and Harness Main Body 21 of Second Embodiment>

In FIG. 4, the long wire harness 9 routed through the vehicle floor 11 includes the harness main body 21 and the shield connectors 14 respectively disposed at the both terminals of the harness main body 21. In addition, the wire harness 9 includes the clamp C for routing itself at the predetermined position, and the water stop member (for example, the grommet or the like) (not shown). The harness main body 21 includes the two long conductive paths 22, the shield member 23 that collectively covers the conductive paths 22, and the exterior member 24 through which the two conductive paths 22 covered with the shield member 23 are inserted. In the second embodiment, the exterior member 24 is the characteristic portion. Specifically, a routing path regulating portion 38 (described later with reference to FIGS. 5A to 6B) provided in the straight pipe portion 28 of the exterior member 24 is a characteristic portion.

<Routing Path Regulating Portion 38>

In FIGS. 4 to 6B, the routing path regulating portion 38 is provided in the straight pipe portion 28 of the exterior member 24, in order to provide the wire harness 9 that can be bent when packing the harness and can regulate the path when the vehicle is routed, for example. The routing path regulating portion 38 includes one divided portion 39 and another divided portion 40 that are formed into a shape in which the middle in the pipe axis direction of the straight pipe portion 28 corresponding to the vehicle floor 11 is divided, and a connecting tubular portion 42 made of a resin in which an internal space 41 that forms a desired path (substantially S-shaped path in the present embodiment) is formed and that connects the one divided portion 39 and the other divided portion 40.

Two holes 43 for fitting, positioning, and retaining are respectively formed in the one divided portion 39 and the other divided portion 40. The connecting tubular portion 42 has a spit-in-half structure, and is formed of half tubular portions 44, 45. The half tubular portions 44, 45 are respectively formed with protrusions 46 that fit into the holes 43. In addition, the half tubular portions 44, 45 are respectively formed with lock portions 47, 48 for integrating them.

<Manufacturing to Path Routing of Wire Harness 9>

In the above configuration and structure, the wire harness 9 is manufactured as follows (see FIGS. 4 to 6B). That is, the wire harness 9 is manufactured by inserting the two conductive paths 22 covered with the shield member 23 from the one end opening to the other end opening of the exterior member 24. At this time, the two conductive paths 22 covered with the shield member 23 are partially exposed from the one divided portion 39 and the other divided portion 40 in the straight pipe portion 28.

The wire harness 9 is manufactured by attaching the clamp C, the grommet, the boot, or the like to the predetermined position on the outer surface of the exterior member 24. Further, the wire harness 9 is manufactured by providing the shield connectors 14 at terminal portions of the conductive path 22.

After the wire harness 9 is manufactured as described above, the bending is performed by folding the flexible pipe portion 27 at the predetermined position, and the bent state is maintained. Further, the one divided portion 39 and the other divided portion 40 are folded into a substantially parallel state from a straight state, and a portion exposed from the one divided portion 39 and the other divided portion 40 is formed as a packing bent portion (see FIGS. 5A and 5B). As a result, the packing of the wire harness 9 is completed (stored in the box). Since the wire harness 9 is formed with the packing bent portion 49 that does not exist in the past, a packing state becomes compact, and the wire harness 9 is transported to the vehicle assembly site while remaining in the compact packing state.

At the vehicle assembly site, the wire harness 9 is attached to the vehicle from the long portion corresponding to the vehicle floor 11 (from the straight pipe portion 28 having the one divided portion 39 and the other divided portion 40). At this time, an operation of returning the one divided portion 39 and the other divided portion 40 to the substantially straight state is performed (see FIGS. 5B and 5C), and a preparation for assembling the half tubular portions 44, 45 as the connecting tubular portion 42 is performed. In addition, when an operation of connecting the one divided portion 39 and the other divided portion 40 is performed by the connecting tubular portion 42 so as to cover the portion exposed from the one divided portion 39 and the other divided portion 40, the routing path regulating portion 38 is provided to the portion where there is the packing bent portion 49 (see FIGS. 6A and 6B).

The routing path regulating portion 38 for regulating a path in a substantially S-shape is provided on the portion where the packing bent portion 49 is formed, and after the long portion corresponding to the vehicle floor 11 is fixed by the clamp C or the like, when the remaining portion is fixed by the clamp C while deflecting (bending) the portion of the flexible pipe portion 27 in the exterior member 24, a series of operations related to the path routing of the wire harness 9 is completed. The wire harness 9 is routed in the desired path.

<Effect of Wire Harness 9>

As described above with reference to FIGS. 4 to 6B, in the wire harness 9 according to the second embodiment, the one divided portion 39 and the other divided portion 40 is formed in the middle of the exterior member 24, and the packing bent portion 49 is formed using a divided portion, so that the wire harness 9 can be packed in the compact state by the packing bent portion 49. In addition, according to the wire harness 9, by connecting the one divided portion 39 and the other divided portion 40 using the connecting tubular portion 42 for the desired path, the routing path regulating portion 38 is provided at the packing bent portion 49, so that the wire harness 9 can be regulated in the desired path when the harness is routed in a path (when routing the harness) even if there is the packing bent portion 49.

Therefore, there is an effect that it is possible to provide the wire harness 9 that can be bent when packing the harness and can regulate the path when the vehicle is routed. In addition, there is also an effect that the wire harness 9 can be packed in the compact state. Accordingly, there is an effect that the more wire harnesses 9 can be accommodated in the box and transported than before. Further, since the large number of wire harnesses 9 can be transported at a time, there is an effect that transportation cost can be reduced, for example.

Third Embodiment

Figure 7:
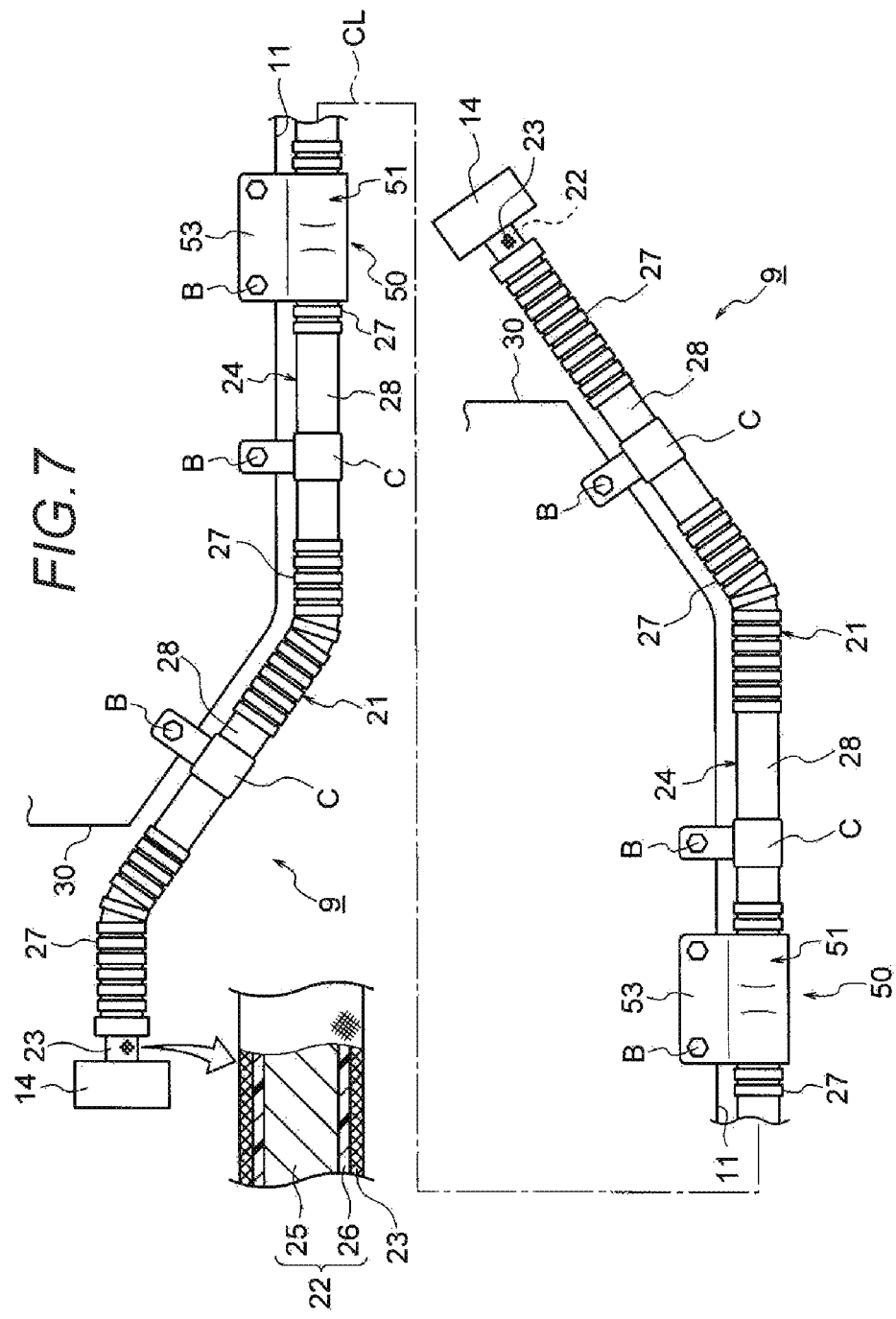
FIG. 7 is a schematic view showing a configuration of still another wire harness (third embodiment).

A third embodiment will be described below with reference to the drawings. FIG. 7 is a schematic view showing a configuration of still another wire harness. In addition, FIGS. 8A to 9B are views relating to the manufacture to routing of the wire harness. Incidentally, the same components as in the first embodiment are denoted by the same reference numerals, and a detailed description thereof is omitted.

<Configurations of Wire Harness 9 and Harness Main Body 21 of Third Embodiment>

In FIG. 7, the long wire harness 9 routed through the vehicle floor 11 includes the harness main body 21 and the shield connector 14 respectively disposed at the both terminals of the harness main body 21. In addition, the wire harness 9 includes the clamp C for routing itself at the predetermined position, and the water stop member (for example, the grommet or the like) (not shown). The harness main body 21 includes the two long conductive paths 22, the shield member 23 that collectively covers the conductive paths 22, and the exterior member 24 through which the two conductive paths 22 covered with the shield member 23 are inserted. In the third embodiment, the exterior member 24 is the characteristic portion. Specifically, a routing path regulating portion 50 (described later with reference to FIGS. 8A to 9B) provided in the straight pipe portion 28 of the exterior member 24 is a characteristic portion.

<Routing Path Regulating Portion 50>

In FIGS. 7 to 9B, the routing path regulating portion 50 is provided in the flexible pipe portion 27 of the exterior member 24, in order to provide the wire harness 9 that can be bent when packing the harness and can regulate the path when the vehicle is routed, for example. In the present embodiment, the routing path regulating portion 50 is provided by assembling a post-attaching member 51 to the relatively short flexible pipe portion 27 arranged together with the straight pipe portion 28 corresponding to the vehicle floor 11.

The post-attaching member 51 is made of a resin or metal, includes a recess portion 52 in which a desired path (for example, a substantially S-shaped path) is formed, and a pair of fixing portions 53 that are connected to edges of the recess portion 52, and is formed, for example, into a shape as shown in FIG. 8C (schematically shown in FIG. 7). The fixing portion 53 is formed with bolt insertion holes 54 for fixing a bolt B to the vehicle floor 11. The post-packing member 51 is a member that can regulate a shape of the desired path by changing a bending shape of a packing bent portion 55 described later.

<Manufacturing to Path Routing of Wire Harness 9>

In the above configuration and structure, the wire harness 9 is manufactured as follows (see FIGS. 7 to 9B). That is, the wire harness 9 is manufactured by inserting the two conductive paths 22 covered with the shield member 23 from the one end opening to the other end opening of the exterior member 24. The wire harness 9 is manufactured by attaching the clamp C, the grommet, the boot, or the like to the predetermined position on the outer surface of the exterior member 24. Further, the wire harness 9 is manufactured by providing the shield connectors 14 at terminal portions of the conductive path 22.

After the wire harness 9 is manufactured as described above, the bending is performed by folding the flexible pipe portion 27 at the predetermined position, and the bent state is maintained. In addition, the flexible pipe portion 27 (see FIG. 8A) at the position corresponding to the vehicle floor 11 is bent, and the bent portion forms as the packing bent portion 55 (see FIG. 8B). As a result, the packing of the wire harness 9 is completed (stored in the box). Since the wire harness 9 is formed with the packing bent portion 55, the packing state becomes compact, and the wire harness 9 is transported to the vehicle assembly site while remaining in the compact packing state.

Figure 9A:
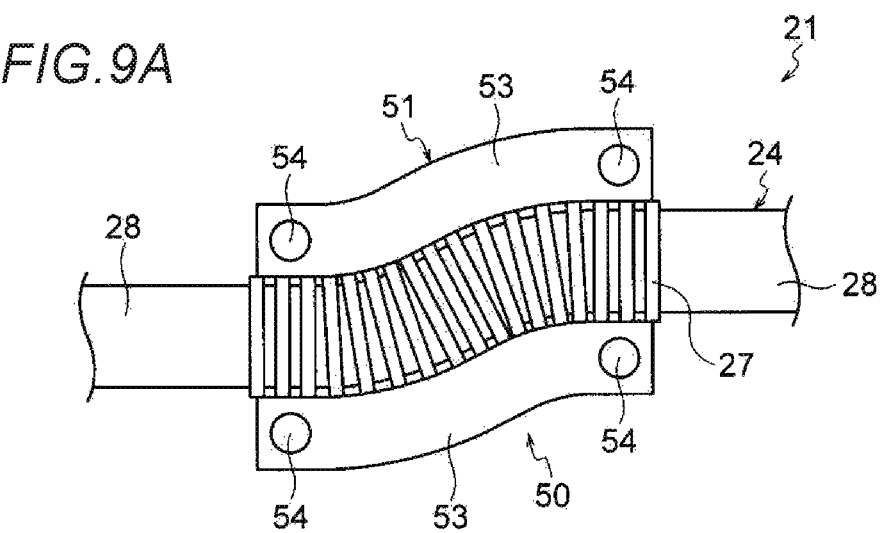
FIGS. 9A and 9B are views immediately before routing following FIGS. 8A to 8C.

At the vehicle assembly site, the wire harness 9 is attached to the vehicle from the long portion corresponding to the vehicle floor 11 (from the straight pipe portion 28 in which the flexible pipe portion 27 formed with the packing bent portion 55 is continuous). At this time, an operation of returning the flexible pipe portion 27 formed with the packing bent portion 55 to the substantially straight state is performed (see FIGS. 8B and 8C), and a preparation for assembling the post-attaching member 51 is performed. In addition, when an operation of assembling the post-attaching member 51 is performed so as to cover the flexible pipe portion 27 thereafter, the routing path regulating portion 50 is provided to the portion where there is the packing bent portion 55 (FIG. 9A). Incidentally, if it is desired to regulate the path in a straight state, a post-attaching member 56 may be used as shown in FIG. 9B.

Figure 9B:
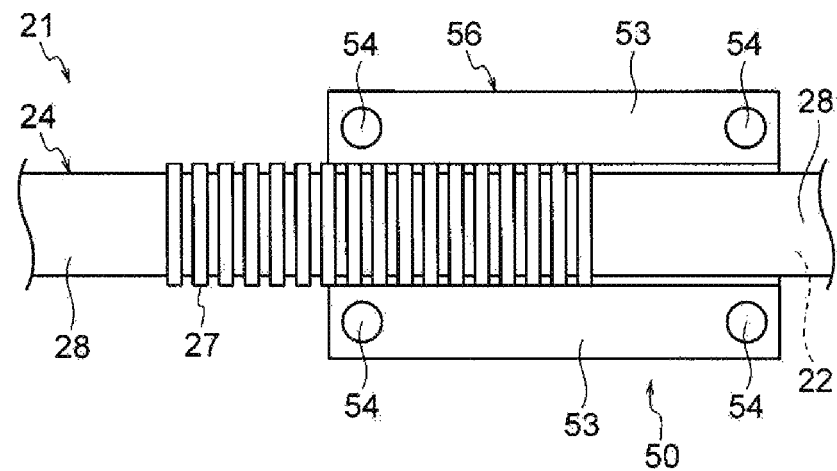

In FIGS. 8A and 9B, the routing path regulating portion 50 for regulating a path in the substantially S-shape is provided on the portion where the packing bent portion 55 is formed, and after the long portion corresponding to the vehicle floor 11 is fixed by the clamp C or the like, when the remaining portion is fixed by the clamp C while deflecting (bending) the portion of the flexible pipe portion 27 in the exterior member 24, a series of operations related to the path routing of the wire harness 9 is completed. The wire harness 9 is routed in the desired path.

<Effect of Wire Harness 9>

As described above with reference to FIGS. 7 to 9B, in the wire harness 9 according to the third embodiment, the flexible pipe portion 27 is formed in the middle of the exterior member 24, and the packing bent portion 55 is formed using the flexible pipe portion 27, so that the wire harness 9 can be packed in the compact state by the packing bent portion 55. In addition, according to the wire harness 9, the routing path regulating portion 50 is provided at the packing bent portion 55 by assembling the post-attaching member 51 formed with the recess portion 52 for the desired path, so that the wire harness 9 can be regulated in the desired path when the harness is routed in a path (when routing the harness) even if there is the packing bent portion 55.

Therefore, there is an effect that it is possible to provide the wire harness 9 that can be bent when packing the harness and can regulate the path when the vehicle is routed. In addition, there is also an effect that the wire harness 9 can be packed in the compact state. Accordingly, there is an effect that the more wire harnesses 9 can be accommodated in the box and transported than before. Further, since the large number of wire harnesses 9 can be transported at a time, there is an effect that transportation cost can be reduced, for example.

Fourth Embodiment

Figure 10:
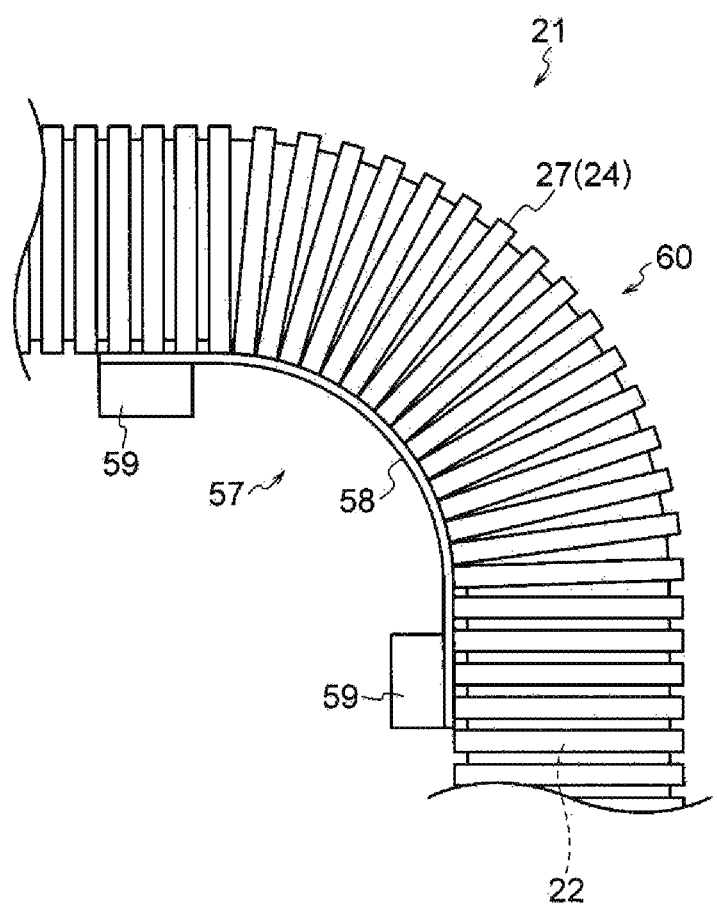
FIG. 10 is a view of yet another wire harness, and is a schematic view showing a state after a length adjustment member is assembled (fourth embodiment).

A fourth embodiment will be described below with reference to the drawings. FIG. 10 is a view of yet another wire harness, and is a schematic view showing a state after a length adjustment member is assembled. Incidentally, the same components as in the third embodiment are denoted by the same reference numerals, and a detailed description thereof is omitted.

<Length Adjustment Member 57>

In FIG. 10, the fourth embodiment is a modification of the third embodiment, and a reference numeral 57 indicates a length adjustment member. In the present embodiment, the length adjustment member 57 is used to regulate the path in a state in which the length adjustment member 57 is bent at approximately 90 degrees. The length adjustment member 57 has a pipe attaching portion 58 that is a portion whose length can be adjusted, and holding portions 59 that hold both end portions of the pipe attaching portion 58. The length adjustment member 57 is a member that can change a path by adjusting the length of the pipe attaching portion 58. A reference numeral 60 indicates a routing path regulating portion. Incidentally, the length adjustment member 57 is arranged at the bent portion on an inner side of the flexible pipe portion 27 as shown in the drawing, but the length adjustment member 57 is not limited thereto, and may be arranged in the bent portion an outer side.

As described above with reference to FIG. 10, in the wire harness 9 according to the fourth embodiment, the flexible pipe portion 27 is formed in the middle of the exterior member 24, and the packing bent portion 55 (see FIG. 8B) and the routing path regulating portion 60 are formed using the flexible pipe portion 27, so that the wire harness 9 can be packed in the compact state by the packing bent portion 55. In addition, according to the wire harness 9, by assembling the length adjustment member 57 formed with the pipe attachment portion 58 so as to form the desired path, the routing path regulating portion 60 is provided at the packing bent portion 55, so that the wire harness 9 can be regulated in the desired path when routing the harness even if there is the packing bent portion 55.

It goes without saying that the present invention can be variously modified without departing from the gist of the present invention.

DESCRIPTION OF REFERENCE NUMERALS AND SIGNS 1 hybrid automobile
2 engine
3 motor unit
4 inverter unit
5 battery
6 engine compartment
7 automobile rear portion
8, 9 wire harness
10 intermediate portion
11 vehicle floor
12 junction block
13 harness terminal
14 shield connector
15 wire harness
16 low voltage battery
17 automobile front portion,
18 auxiliary device
19 harness main body
20 connector
21 harness main body
22 conductive path
23 shield member
24 exterior member
25 conductor
26 insulator
27 flexible pipe portion
28 straight pipe portion
29 joint mechanism
30 counterpart fixing member
31 packing bent portion
32 one divided portion
33 the other divided portion
34 base portion
35 one rotating shaft portion
36 the other rotating shaft portion
37, 38 routing path regulating portion
39 one divided portion
40 the other divided portion
41 internal space
42 connecting tubular portion
43 hole
44, 45 half tubular portion
46 protrusion
47, 48 lock portion
49 packing bent portion
50 routing path regulating portion
51 post-attaching member
52 recess portion
53 fixing portion
54 bolt insertion hole
55 packing bent portion
56 post-attaching member
57 length adjustment member
58 pipe attaching portion
59 holding portion
60 routing path regulating portion
B bolt
C clamp
CL pipe axis

What is claimed is:

1. A wire harness comprising:
a harness main body including one or a plurality of conductive paths and an exterior member through which the one or a plurality of conductive paths is inserted;
a packing bent portion arranged in a middle of the harness main body and used as a bent portion at a position suitable for packing the wire harness; and a routing path regulating portion arranged at the position suitable for packing the wire harness and configured to regulate the wire harness at a desired path when routing the wire harness, wherein the exterior member includes a joint mechanism in accordance with the position suitable for packing the wire harness, wherein the joint mechanism includes one divided portion and another divided portion that are arranged so as to be separated from each other in an axial direction of the exterior member, an integral base portion arranged so as to overlap the one divided portion and the other divided portion, one rotating shaft portion for making the one divided portion rotatable with respect to one end of the base portion, and another rotating shaft portion for making the other divided portion rotatable with respect to the other end of the base portion, wherein the packing bent portion is formed when the one divided portion and the other divided portion are arranged in a folded state without being connected to each other by the joint mechanism, wherein the routing path regulating portion is arranged at the position suitable for packing the wire harness when the one divided portion and the other divided portion are arranged in a substantially linear shape by the joint mechanism, wherein the wire harness is further comprising a flexible pipe portion having a flexibility in a middle of the exterior member in an axial direction, wherein the packing bent portion of the flexible pipe portion is formed when the flexible pipe portion is bent into the folded state, and wherein the routing path regulating portion is arranged at the position suitable for packing the wire harness when a post-attaching member having a recess portion for the desired path is assembled to the flexible pipe portion released from the folded state.

\* \* \* \* \*